United States Patent [19]
Saryo

[11] Patent Number: 6,087,980
[45] Date of Patent: Jul. 11, 2000

[54] RADAR OF FM-CW SYSTEM

[75] Inventor: Tomoaki Saryo, Tokyo, Japan

[73] Assignee: NEC Corporation, Tokyo, Japan

[21] Appl. No.: 09/191,941

[22] Filed: Nov. 13, 1998

[30] Foreign Application Priority Data

Nov. 14, 1997 [JP] Japan .................................... 9-331216

[51] Int. Cl.$^7$ .................................................. G01S 13/32
[52] U.S. Cl. ......................... 342/128; 342/159; 342/175; 342/195
[58] Field of Search .................................... 342/128, 129, 342/130, 131, 132, 133, 159, 175, 195

[56] References Cited

U.S. PATENT DOCUMENTS 3,374,478 3/1968 Blau ........................................ 342/159

FOREIGN PATENT DOCUMENTS

| | | |
|---|---|---|
| 57-125863 | 8/1982 | Japan . |
| 59-79176 | 5/1984 | Japan . |
| 62-112085 | 5/1987 | Japan . |
| 4-208723 | 7/1992 | Japan . |
| 5-215842 | 8/1993 | Japan . |
| 5-240947 | 9/1993 | Japan . |
| 5-264728 | 10/1993 | Japan . |
| 6-273514 | 9/1994 | Japan . |
| 9-243738 | 9/1997 | Japan . |

OTHER PUBLICATIONS

Japanese Office Action issued Apr. 27, 1999 in a related application. English–language translation of relevant portions of Apr. 27, 1999 Japanese Office Action.

*Primary Examiner*—Bernarr E. Gregory
*Attorney, Agent, or Firm*—Ostrolenk, Faber, Gerb & Soffen, LLP

[57] ABSTRACT

In a radar of FM-CW system having a transmitting and a receiving unit 20 and 28 both connected to a transmitting/receiving antenna 26 via a circulator 24, a high frequency switch 22 for transmission, is inserted and turns on and off the path between the transmitting unit 20 and the circulator 24, and in the receiving operation of the receiving unit 28 the high frequency switch 22 for transmission is controlled according to a switch control signal 320a provided from a signal processing unit 30 such as to be held "off" to hold the transmission output of the transmitting unit 20 "off" for a predetermined time, thus reducing sneak noise component between the transmission and reception. Thus it makes possible to reduce sneak noise between the transmission and reception, and readily realize cost reduction without need of separate antennas for the transmission and reception.

21 Claims, 10 Drawing Sheets

RADAR OF FM-CW SYSTEM

BACKGROUND OF THE INVENTION

The present invention relates to a radar of FM-CW system used for fast inter-vehicle distance measurement in highway traffic systems and, more particularly, to a radar capable of reducing sneak noise between the transmission and reception.

A prior art radar will now be described with reference to FIGS. 10 and 11. FIG. 10 is a block diagram showing a prior art FM-CW radar for inter-vehicle distance measurement. Referring to the Figure, the illustrated FM-CM radar comprises a transmitting unit 101, a circulator 102, a transmitting/receiving antenna 103, a receiving unit 104, and a signal processing unit 105 for judging a target by calculating the distance thereof, relative speed thereof and so forth.

The transmitting unit 101 includes a triangular modulating signal generator 101A for generating a triangular modulating signal, an oscillator 101B for generating a continuous oscillation signal by frequency modulating a carrier with the triangular modulating signal, and an amplifier 107D for amplifying the oscillation signal coupled from the oscillator 101B through a distributor 101C. The amplified oscillation signal from the amplifier 101D is coupled through the circulator 102 to the transmitting/receiving antenna 103 and transmitted toward a target (not shown).

The receiving unit 104 includes a mixer 104A for mixing a reflected wave signal from a target, which is received by the transmitting/receiving antenna 103 and the oscillation signal coupled from the oscillator 101B through the distributor 101C to extract a beat signal, and an amplifier 104B for amplifying the frequency band of the beat signal output of the mixer 104A.

The signal processing unit 105 includes an A/D converter 105A for converting the beat signal from the amplifier 104B in the receiving unit 104 to a digital signal, a frequency analyzer 105B for analyzing the digital beat signal from the A/D converter 105A to obtain a frequency characteristic and a spectral characteristic through fast Fourier transformation (FFT), and a microcomputer (CPU) 105C for computing the distance and azimuthal data of the target or relative speed thereof according to the results of analysis in the frequency analyzer 105B.

FIG. 11 is a block diagram showing a different prior art FM-CW radar. In the Figure, elements like those shown in FIG. 10 are designated by like reference numerals. This FM-CW radar comprises, in addition to a transmitting unit 101, a receiving unit 104 and a signal processing unit 105 having the same structures as those shown in FIG. 10, a transmitting antenna 106 and a receiving antenna 107. The antennas 106 and 107 are provided independently while omitting the circulator.

In this antenna, the oscillation signal from the transmitting unit 101 is thus transmitted directly from the transmitting antenna 106 toward a target. Also, the reflected wave from the target is received in the receiving unit 104 through the exclusive receiving antenna 107.

In the prior art FM-CW radar shown in FIG. 10, the noise components that have adverse effects on the reception sensitivity of the receiving unit 104 are those introduced as phase noise from the transmitting unit 101 through the circulator 102 to the receiving unit 104. To suppress such sneak noise, it is conceivable to reduce the phase noise in the oscillator 101B or increase the isolation of the circulator 102.

However, increasing the isolation of the circulator is difficult particularly for a high frequency of a millimeter wave. Even if it is possible, such problems as the necessity of a time-consuming circulator adjusting operation and cost increase are posed. Reducing the oscillator phase noise, on the other hand, poses such a problem as it is difficult to sufficiently suppress the phase noise in case when it is designed such as to provide a great oscillator frequency range.

With the prior art FM-CW radar shown in FIG. 11, having the separately provided transmitting and receiving antennas 106 and 107, interference between the transmission and reception can be prevented by the isolation between the two antennas. It is thus possible to solve the problems in the radar shown in FIG. 10.

In this radar, however, restriction is imposed on the disposition of the two, i.e., transmitting and receiving antennas. Particularly, when the beam number is increased to increase the azimuthal resolution, the radar housing size is increased.

SUMMARY OF THE INVENTION

An object of the present invention is therefore to provide a radar capable of reduction of the sneak noise between the transmission and reception and radar maintenance cost reduction without need of providing separate transmitting and receiving antennas.

According to an aspect of the present invention, there is provided a radar comprising: a transmitting/receiving antenna; a transmitting unit connected to the antenna via branching means, for transmitting a continuous transmission signal obtained by frequency modulating a carrier with a modulating signal varying with time; a receiving unit connected to said antenna via said branching means, for mixing a reflected wave signal received from a target via said antenna and a reference signal branched from the transmission signal, extracting a beat signal from the mixture of signals, and sampling and holding said beat signal, a high frequency switch for transmission; inserted and for turning on and off the path between said transmitting unit and said branching means; and control means for providing a sample/hold control signal synchronized to a sample/hold cycle when the receiving unit samples and holds the beat signal, and blocking the transmission output of said transmitting unit for a predetermined period of time by controlling said high frequency switch "off" in synchronism to said sample/hold control signal.

According to another aspect of the present invention, there is provided an FM-CW radar comprising: a transmitting/receiving antenna; a transmitting unit connected to said antenna, for transmitting a continuous transmission signal obtained by frequency modulating carrier with a modulating signal varying with time; a receiving unit connected to said antenna for mixing a reflected wave signal received from a target via said antenna and a reference signal branched from the transmission signal, extracting a beat signal from the mixture of signals, and sampling and holding the beat signal; a high frequency switch inserted and switched alternately between said antenna and transmitting and receiving units; and control means for providing, when sampling and holding the beat signal, a sample/hold control signal synchronized to a sample/hold cycle, the high frequency switch being controlled according to the sample/hold control signal such as to be in connection to said receiving unit for a predetermined time and in connection to the transmitting unit for the other time than said predetermined time.

The sample/hold cycle for sampling and holding said beat signal is set according to a modulating frequency of the modulation of the transmission signal and a sampling frequency which is determined on the basis of the maximum frequency deviation of said modulating signal, the maximum calculated target distance and the velocity of light.

The predetermined time is set to be between a time of sampling of said beat signal and a time as a result of subtraction of a time, during which said high frequency switch for transmission is held "on", from the sampling sample/hold cycle.

The timing of start of holding said high frequency switch for transmission for the predetermined time is set to be before the timing of start of sampling of the beat signal by a time corresponding to a delay of response of said high frequency switch to transmission.

The transmitting unit includes a triangular modulating signal generator for generating a triangular modulating signal, an oscillator for generating a continuous wave through frequency modulation with the triangular modulating signal from said triangular modulating signal generator, and a high frequency amplifier for amplifying the continuous wave from said oscillator and sending the amplified continuous wave to said antenna.

The receiving unit includes a mixer, a beat signal amplifier and a sample/hold circuit; the mixer mixes a reflected wave signal received from a target by said antenna and a reference signal branched from said transmission signal and extracting a beat signal from the mixture of signals; the beat signal amplifier amplifies the frequency band of the beat signal from said mixer; and the sample/hold circuit samples and holds the amplified beat signal output of said beat signal amplifier according to a sample/hold control signal.

The radar further comprises signal processing means for judging the distance, azimuth, relative speed, etc. of a target by processing the output signal of the sample/hold circuit in the receiving unit as a result of sampling and holding the beat signal.

The signal processing means includes an A/D converter for converting the output signal of said sample/hold circuit to a digital signal, a frequency analyzer for determining a frequency characteristic and a spectral characteristic of the beat signal by analyzing the beat signal on the basis of the digital signal from the A/D converter, and for determining the distance, azimuth, relative speed, etc. of the target from the results of analysis in the frequency analyzer.

The branching means is constituted by a circulator and is constituted by a hybrid circuit.

The radar further comprises a high frequency switch for reception inserted and turning on and off the path between said receiving unit and said branching means, said high frequency switch for reception being controlled, in the sampling and holding of the beat signal by the receiving unit, by said control means such as to be held "on" for a predetermined time according to the sample/hold control signal.

According to other aspect of the present invention, there is provided a radar comprising: a radar of FM-CW system having a transmitting and a receiving unit both connected to a transmitting/receiving antenna via a circulator wherein a high frequency switch for transmission is inserted between the transmitting unit and the circulator to turn on and off the path between the transmitting unit and the circulator, and in receiving operation of the receiving unit the high frequency switch is controlled to be turned off for a predetermined time.

In the present invention, the transmission is held "off" during the reception by a high frequency switch, which is inserted on at least the transmitting unit side of the signal path connecting the transmitting and receiving units and the antenna. It is thus possible to permit reduction of the sneak noise between the transmission and reception and readily permit radar maintenance cost reduction without need of separate transmitting and receiving antennas.

Other objects and features will be clarified from the following description with reference to attached drawings.

PREFERRED EMBODIMENTS OF THE INVENTION

Preferred embodiments of the present invention will now be described with reference to the drawings.

Figure 1:
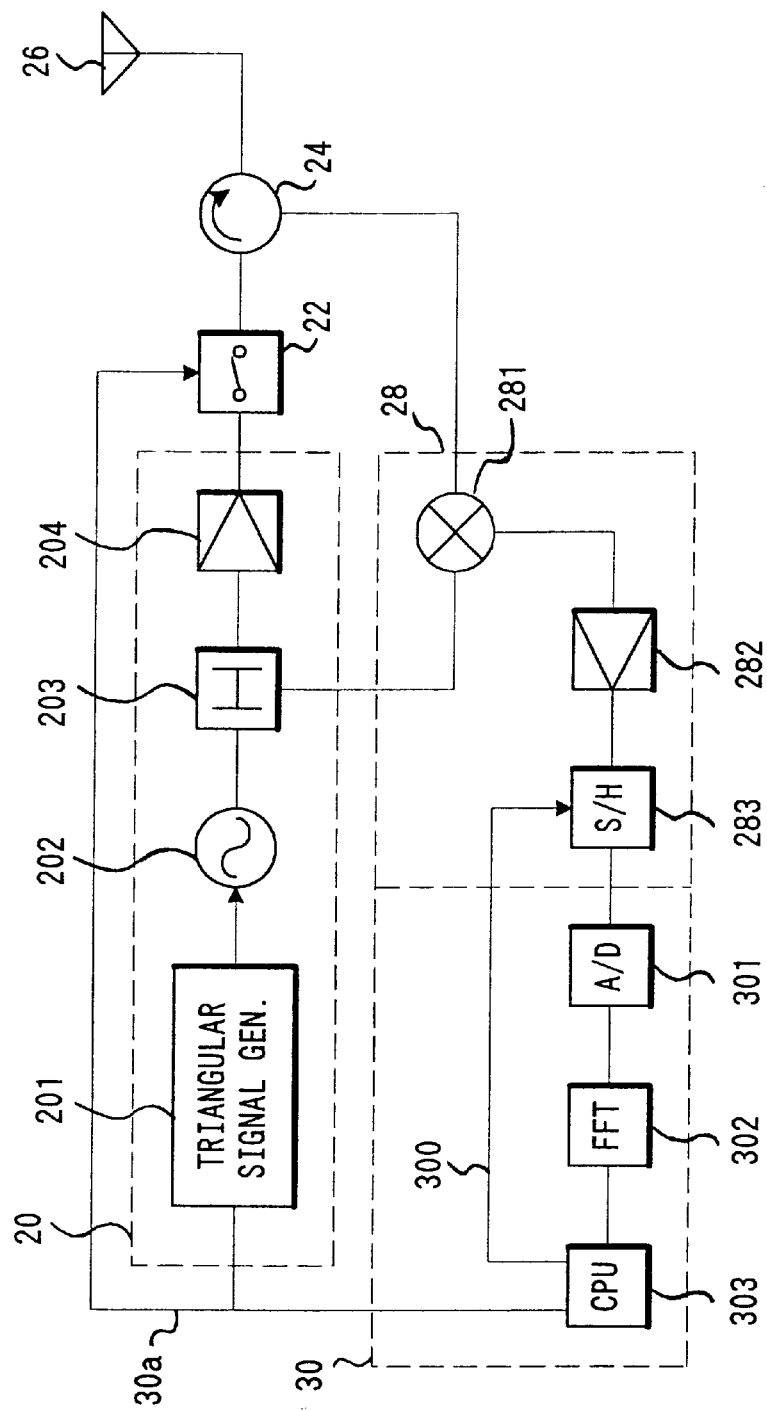
FIG. 1 is a block diagram showing a first embodiment of the FM-CW radar according to the present invention.

FIG. 1 is a block diagram showing a first embodiment of the FM-CW radar according to the present invention.

Referring to the Figure, the illustrated FM-CW radar comprises a transmitting unit 20, a high frequency switch 22 for transmission, a circulator 24, a transmitting/receiving antenna 26, a receiving unit 28, and a signal processing unit 30 for judging the distance and azimuth of a target or relative speed thereof.

The transmitting unit 20 includes a triangular modulating signal generator 201 for generating a triangular modulating signal, an oscillator 202 for generating a continuous oscillation signal by frequency modulating a carrier with the triangular modulating signal, and a high frequency amplifier 204 for amplifying the oscillation signal coupled from the oscillator 202 through a distributor 203. The amplified oscillation signal from the amplifier 204 is coupled through the high frequency switch 22 for transmission and the circulator 24 to the transmitting/receiving antenna 26 and transmitted toward a target (not shown).

The high frequency switch 22 for transmission is a semiconductor switching element such as an FET or a PIN diode, and inserted between the high frequency amplifier 204 in the transmitting unit 20 and the circulator 24. The high frequency switch 22 for transmission is controlled according to a switch control signal 30a provided from the signal processing unit 30 in synchronism to a received signal sampling frequency of the receiving unit 28 such that it interrupts the transmission output of the transmitting unit 20 for a predetermined period of time during the receiving operation of the receiving unit 28.

The receiving unit 28 includes a mixer 281 for mixing a reflected wave signal from a target received by the transmitting/receiving antenna 26, and the oscillation signal (reference signal) coupled from the oscillator 202 through the distributor 203 therein, and extracting a beat signal from the mixture of signals, a beat signal amplifier 282 for amplifying the frequency band of the beat signal output of the mixer 281, and a sample/hold circuit 283 for sampling and holding the amplified beat signal from the beat signal amplifier 282 under control of a sample/hold control signal 30b provided from the signal processing unit 30 in synchronism to the sampling frequency, which is set on the basis of the frequency fm of the modulating signal of the triangular modulating signal generator 201, the reception maximum distance Rmax of the target calculated from the received signal and the maximum frequency deviation ΔF of the modulating signal.

The signal processing unit 30 includes an A/D converter 301 for converting the sampled and held signal output of the sample/hold circuit 283 to a digital signal, a frequency analyzer 302 for analyzing the digital beat signal from the AID converter 301 and obtaining a frequency characteristic and a spectrum characteristic of the beat signal through fast Fourier transformation, and a microcomputer (CPU) for computing the distance and azimuth data of the target or relative speed thereof according to a signal representing the frequency characteristic and spectral characteristic determined in the analysis in the frequency analyzer 302, and providing switch control signal 30a and sampled/hold control signal 30b. The frequency of the modulating signal generated by the triangular modulating signal generator 201 is controlled by the CPU 303.

The operation of the radar having the above construction will now be described. The oscillator 202 generates the continuous oscillation signal by modulating a carrier with the triangular modulating signal from the triangular modulating signal generator 201. The distributor 203 distributes the oscillation signal thus generated to the high frequency amplifier 204 and the mixer 28. The high frequency amplifier 204 power amplifies the oscillation signal input, and transmits the amplified oscillation signal through the high frequency switch 22 for transmission and the circulator 24 to the transmitting/receiving antenna 26 toward a target (not shown).

The transmitting/receiving antenna 26 receives a reflected wave from the target and provides the wave as received signal, which is coupled through the circulator 24 to the receiving unit 28. In the receiving unit 28, the mixer 281 mixes the received signal and the oscillation signal coupled from the oscillator 202 through the distributor 203 in the transmitting unit 20, and extracts a beat signal from the mixture of signals. The beat signal amplifier 282 amplifies the extracted beat signal. The sample/hold circuit 283 samples and holds the amplified beat signal under control of the sample/hold control signal 30b from the CPU 303 in the signal processing unit 30. The A/D converter 301 converts the sampled and held signal from the sample/hold circuit 283 to a digital signal. The frequency analyzer 302 analyzes the digital signal thus obtained, and determines a frequency characteristic and a spectral characteristic of the beat signal through fast Fourier transformation. The CPU 303 determines the distance and azimuthal data of the target or relative speed thereof from the results of the analysis.

The radar having the above construction will now be described in connection with its application to quick measurement of inter-vehicle distances in a highway traffic system with reference to FIGS. 2 and 3.

Figure 2:
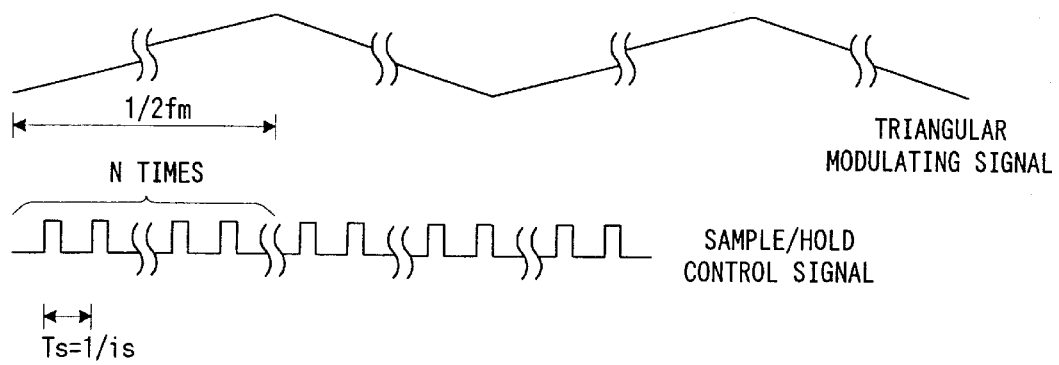
FIG. 2 is a timing chart showing the relation between the triangular modulating signal and the sample/hold control signal in the embodiment.

FIG. 2 is a timing chart showing the relation between the triangular modulating signal and the sample/hold control signal. Referring to the Figure, the sampling and holding are executed N times in a period of ½ fm, fm being the frequency of the triangular modulating signal. In this case, the sample/hold period Ts is Ts=1/fs, fs being the frequency of the sample/hold control signal.

Figure 3:
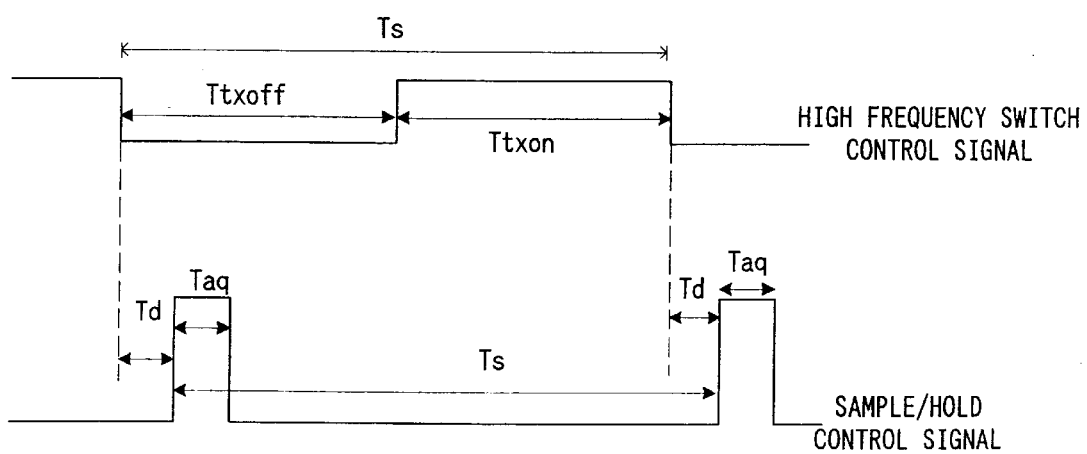
FIG. 3 is a timing chart showing the relation between the high frequency switch control signal for on-off controlling the high frequency switch 22 for transmission and the sample/hold control signal in the embodiment.

FIG. 3 is a timing chart showing the relation between the high frequency switch control signal for on-off controlling the high frequency switch 22 for transmission and the sample/hold control signal.

Denoting the frequency of the triangular modulating signal by fm, the maximum frequency deviation by ΔF and the velocity of light by c, the sample/hold frequency fs of the sample/hold circuit 283 and the maximum calculated distance Rmax of the target from the vehicle, in which the radar according to the present invention is installed, are related as:

$$Rmax = c \cdot fs/(8fm\Delta F).$$

Assuming that ΔF=150 MHz, fm=2 kHz and Rmax=200 m, the sample/hold frequency fs is 400 kHz. Thus, the sample/hold period Ts is 2.5 μs. The high frequency switch 22 for transmission thus may turn on and off the transmission signal in the sample/hold period Ts.

The "on" time Ttxon, during which the transmission wave is held "on", should be Ttxon>1.3μs, because the radar should obtain signals from targets up to about 200 m for the target detection. The remaining time Ttxoff is assigned to the signal reception. During the time Ttxoff, the transmission output of the transmitting unit 20 is held "off" by turning off the high frequency switch 22 for transmission.

The high frequency switch 22, which is an FET or the like, provides a delay of response to the on-off control command, although it is capable of fast switching. For this reason, the start timing of controlling the high frequency switch 22 to be "off" for a predetermined period of time, should be set to be after the beat signal sampling start time by a time Td corresponding to the delay time of the response.

In this embodiment, as shown in FIG. 3, the fall time of the "off" control signal 30a fed from the CPU 303 to the high frequency switch 22, is set to be before the beat signal sampling start time by time Td, and after lapse of this time Td the sample/hold circuit 283 is caused to sample and hold the received signal. The A/D converter 301 converts this signal to a digital signal. In the case shown in FIG. 3, the sample/hold circuit 282 samples the received signal when the sample/hold control signal is "High", and holds the sampled signal when the control signal is "Low".

Denoting the action time required for the sampling by Taq, the minimum detectable distance Rmin is restricted by (Td+Taq), and expressed as $$Rmin = c^*(Td+Taq)/2.$$

When the minimum detectable distance Rmin is set to Rmin=5 m, (Td+Taq) is about 3 ns.

Thus, in this embodiment of the radar the time Ttxoff, during which the high frequency switch 22 for transmission is held "off" in the receiving operation of the receiving unit 28, is desirably set to be (Td+Taq)>Ttxoff=Ts−Ttxon.

In the radar of this system, a pulse wave is provided as the transmission wave by on-off operating the high frequency switch 22. Thus, the sneak noise as in the prior art is eliminated, although reception noise other than sneak noise is increased. This means that sneak noise from the transmission is reduced to an extent corresponding to the isolation of the high frequency switch 22, so that the reception sensitivity can be increased. For example, assuming the isolation of the high frequency switch 22 for transmission to be 10 dB, it is possible to allow more deterioration of the isolation between the transmitting and receiving sides of the circulator than in the prior art by up to 10 dB. With the reduction of the sneak noise between the transmission and reception, the reception sensitivity and the maximum detectable distance can be increased to provide alleviated characteristics of parts and readily permit mass production, thus readily realizing cost reduction of the radar.

Figure 4:
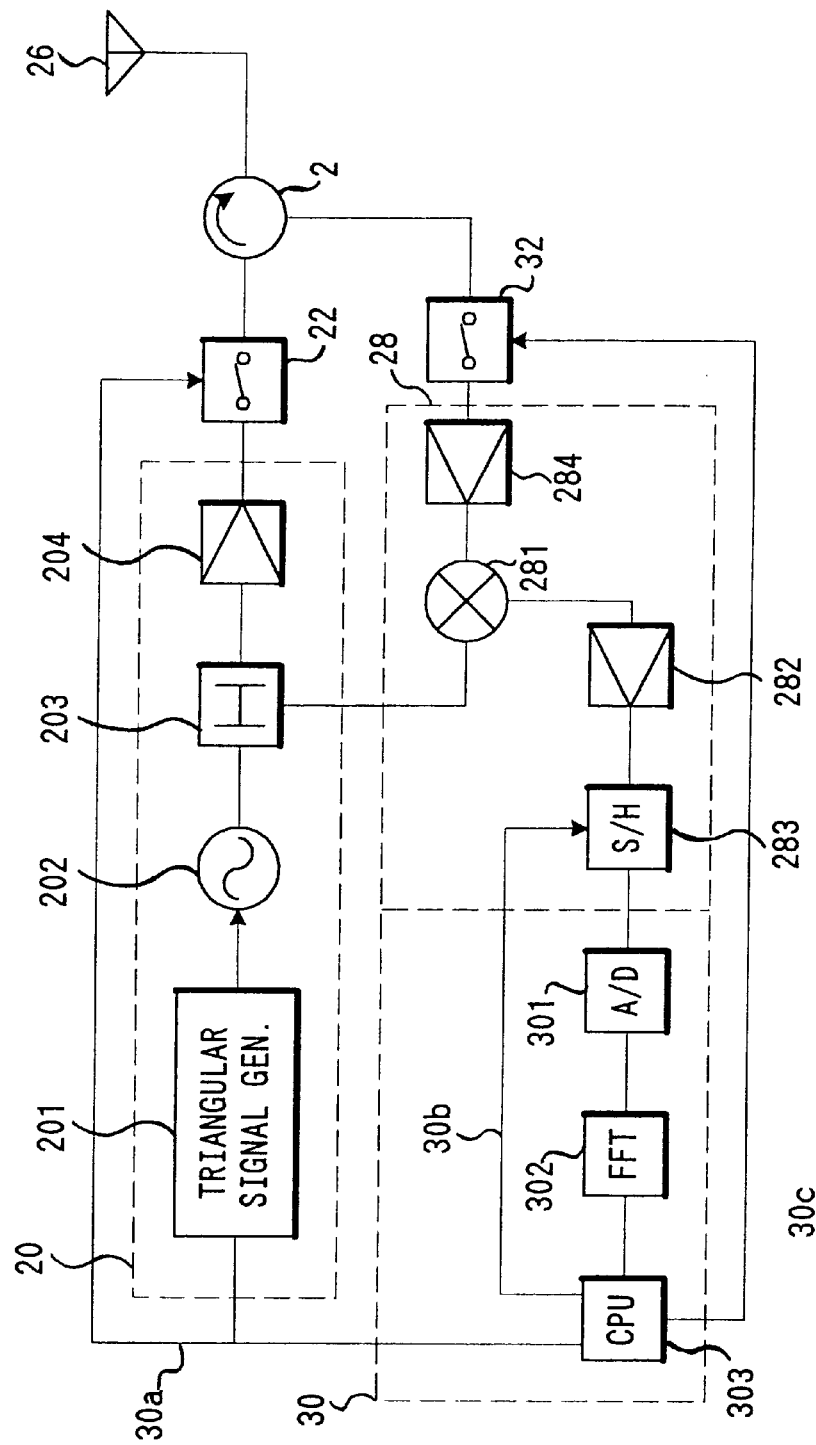
FIG. 4 is a block diagram showing a second embodiment of the FM-CEW radar according to the present invention.
Figure 5:
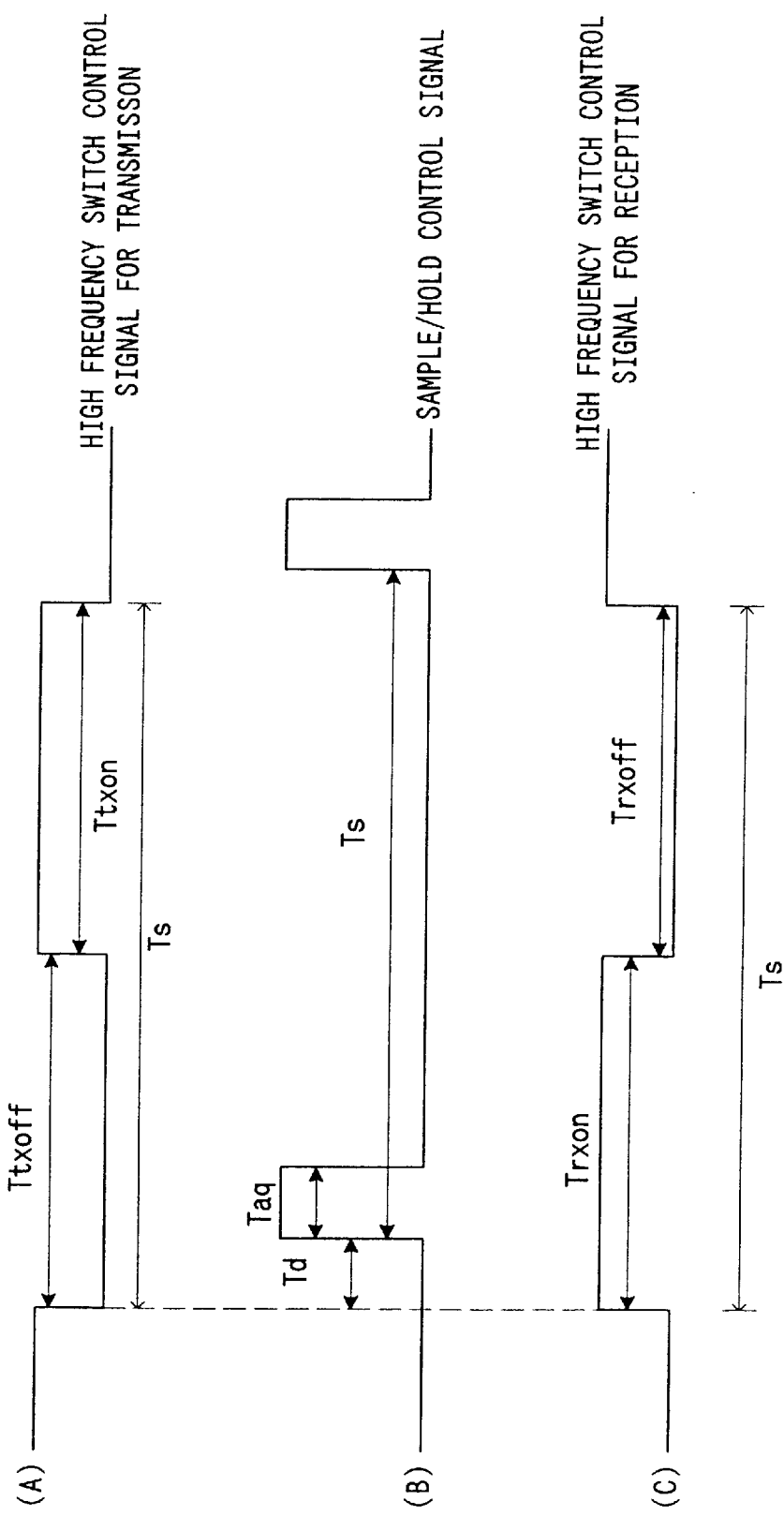
FIG. 5 is a timing chart showing the relationship among on-off control signals for the high frequency switches 22 and 32 for the transmission and reception and a sample/hold control signal in the embodiment.

A second embodiment of the present invention with reference to FIGS. 4 and 5. FIG. 4 is a block diagram showing the second embodiment of the FM-CEW radar according to the present invention. Referring to the Figure, elements like those in FIG. 1 are designated by like reference numerals, while omitting their description, and different parts from FIG. 1 will be mainly described.

This embodiment of the FM-CW radar comprises, in addition to a transmitting unit 20, a high frequency switch 22 for transmission, a circulator 24, a transmitting/receiving antenna 265, a receiving unit 26, a receiving unit 28 and a signal processing unit 30 for judging a target by determining the distance, azimuth, etc. of the target, these elements having structures like those shown in FIG. 1, an additionally provided high frequency switch 32 for reception.

The high frequency switch 32 for reception is inserted between the receiving unit 28 and the circulator 24 and turns on and off the path therebetween, and is controlled according to a control signal 30c provided from the CPU 303 in the signal processing unit 30 such that it is held "on" for a predetermined period of time during the receiving operation of the receiving unit 298. For the high frequency switch 32 for reception, a low noise amplifier 284 is connected before the mixer 281 in the receiving unit 28.

FIG. 5 is a timing chart showing the relationship among on-off control signals for the high frequency switches 22 and 32 for the transmission and reception and a sample/hold control signal. Referring to the Figure, labeled (A) is the on-off control signal for the high frequency switch 22 for transmission, labeled (B) is the sample/hold control signal for the sample/hold circuit 283 in the receiving unit 20, and labeled (C) is the on-off control signal for the high frequency switch 32 for reception.

As is seen from the Figure, like the preceding first embodiment, the timing of on-off operating the high frequency switch 22 is controlled in synchronism to the sample/hold control signal 30a.

As shown in (B) and (C) in FIG. 5, the rise time of the "on" control signal 30c supplied from the CPU 303 to the high frequency switch 32 is set to be before the time of sampling start of the beat signal by time Td. After the lapse of the time Td, the sample/hold circuit 283 samples and holds the received signal.

Thus, the time Trxon, during which the high frequency switch 32 is held "on" in the receiving operation of the receiving unit 28, is set to be (Td+Taq)>Trxon=Ts−Troxoff.

As for the effects of this embodiment, with the high frequency switch 32 provided on the receiving side and the low noise amplifier 284 provided before the mixer 281 in the receiving unit 218, it is possible to increase the breakdown power concerning the sneak noise from the receiving side in addition to obtain the same effect as in the first embodiment.

Figure 6:
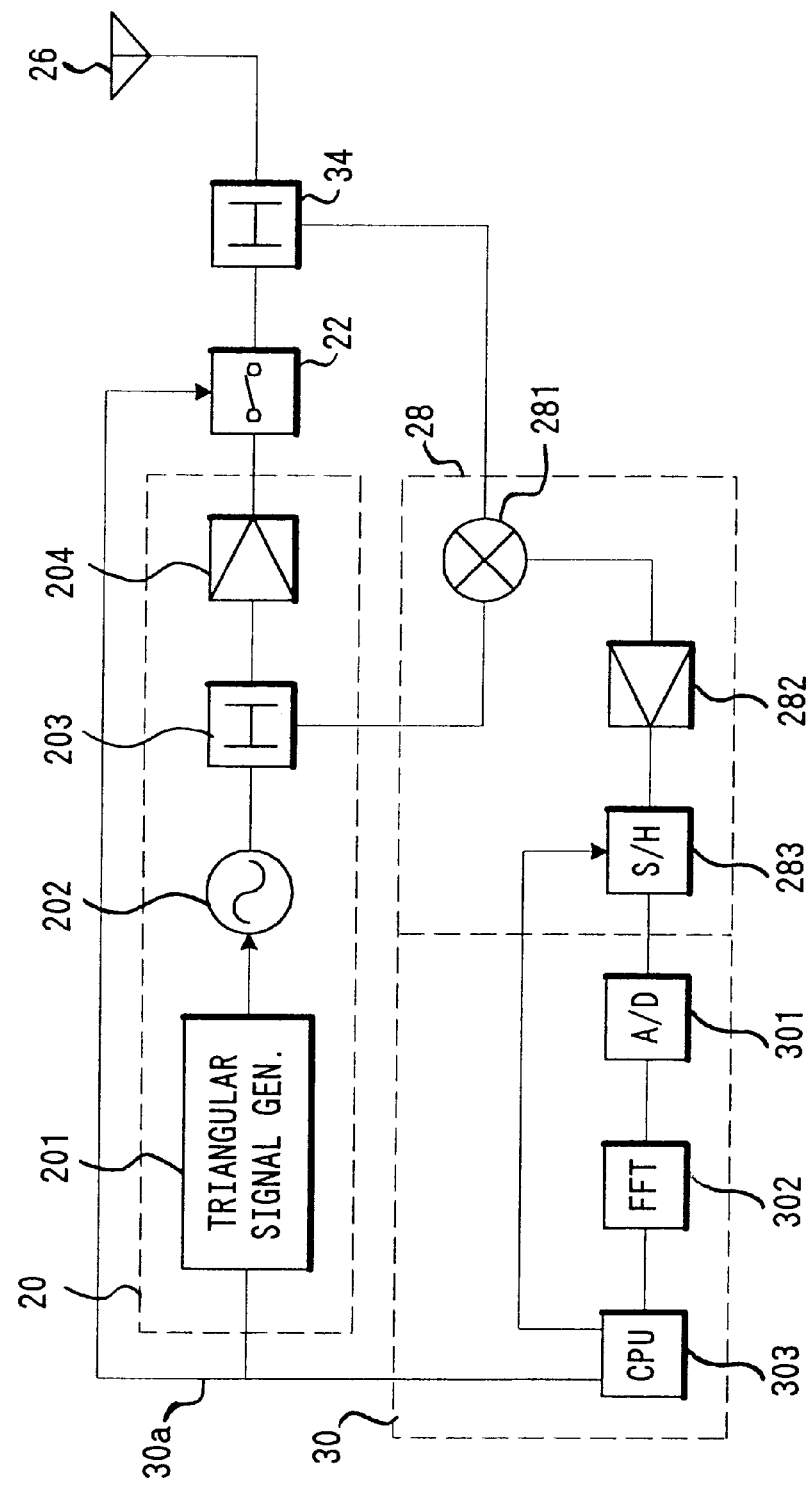
FIG. 6 is a block diagram showing a third embodiment of the FM-CW radar according to the present invention.

A third embodiment of the present invention will now be described with reference to FIGS. 6 and 7. FIG. 6 is a block diagram showing the third embodiment of the FM-CW radar according to the present invention. In the Figure, elements like those shown in FIG. 1 are designated by like reference numerals, while omitting their description, and parts different from FIG. 1 will be mainly described.

This embodiment of the FM-CW radar comprises, in addition to a transmitting unit 20, a high frequency switch 22 for transmission, a transmitting/receiving antenna 26, a receiving unit 28 and a signal processing unit 30 for judging a target by calculating the relative distance, azimuth, etc. thereof, these elements having structures like those shown in FIG. 1, a hybrid circuit 34 in lieu of the circulator as branching means for branched circulation of the transmission signal coupled from the transmitting unit 20 through the high frequency switch 22 for transmission and the received signal from the antenna 26.

Figure 7:
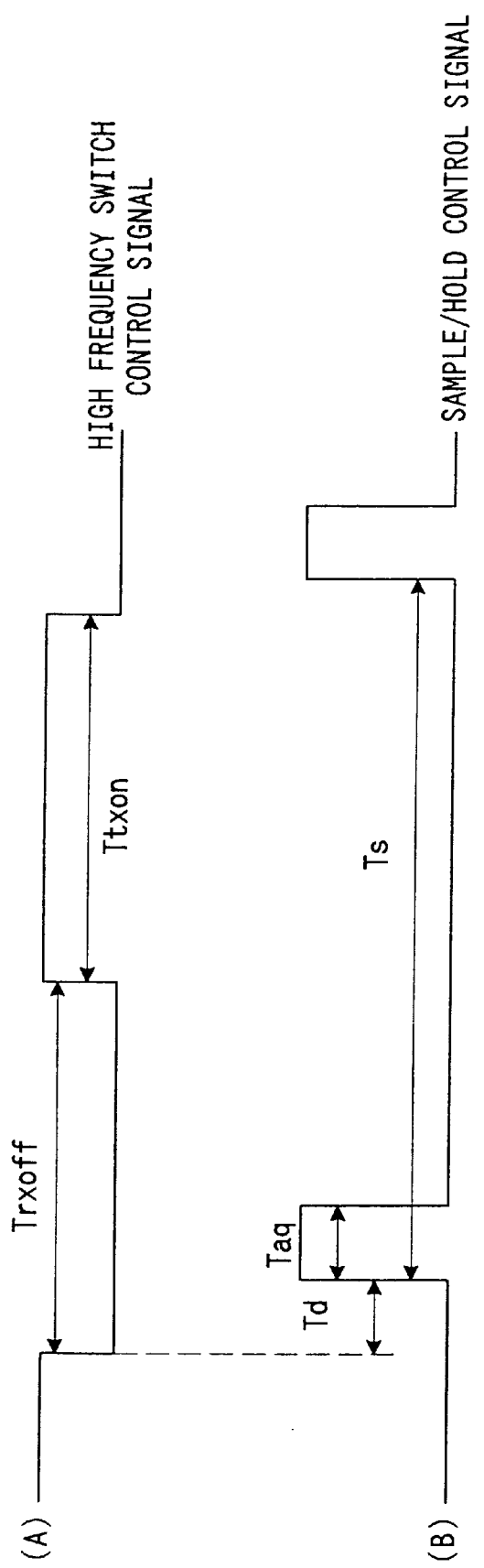
FIG. 7 is a timing chart showing the relation between the on-off control signal for the high frequency switching 22 and the sample/hold control signal in the embodiment.

FIG. 7 is a timing chart showing the relation between the on-off control signal for the high frequency switching 22 and the sample/hold control signal.

In the Figure, labeled (A) is the on-off control signal from the high frequency switch 22 for transmission, and labeled (B) is the sample/hold control signal for the sample/hold circuit 283 in the receiving unit 230. In this case, like the previous first embodiment, the timings of turning on and off the high frequency switch 22 for transmission and controlled in synchronism to the sample/hold control signal 30a.

As for the effects of this embodiment, with the hybrid circuit 34 used as branching means for branched circulation of the transmission and reception signals, it is possible to readily realize the branching means as a monolythic IC in addition to obtain the same effects as in the first embodiment.

Figure 8:
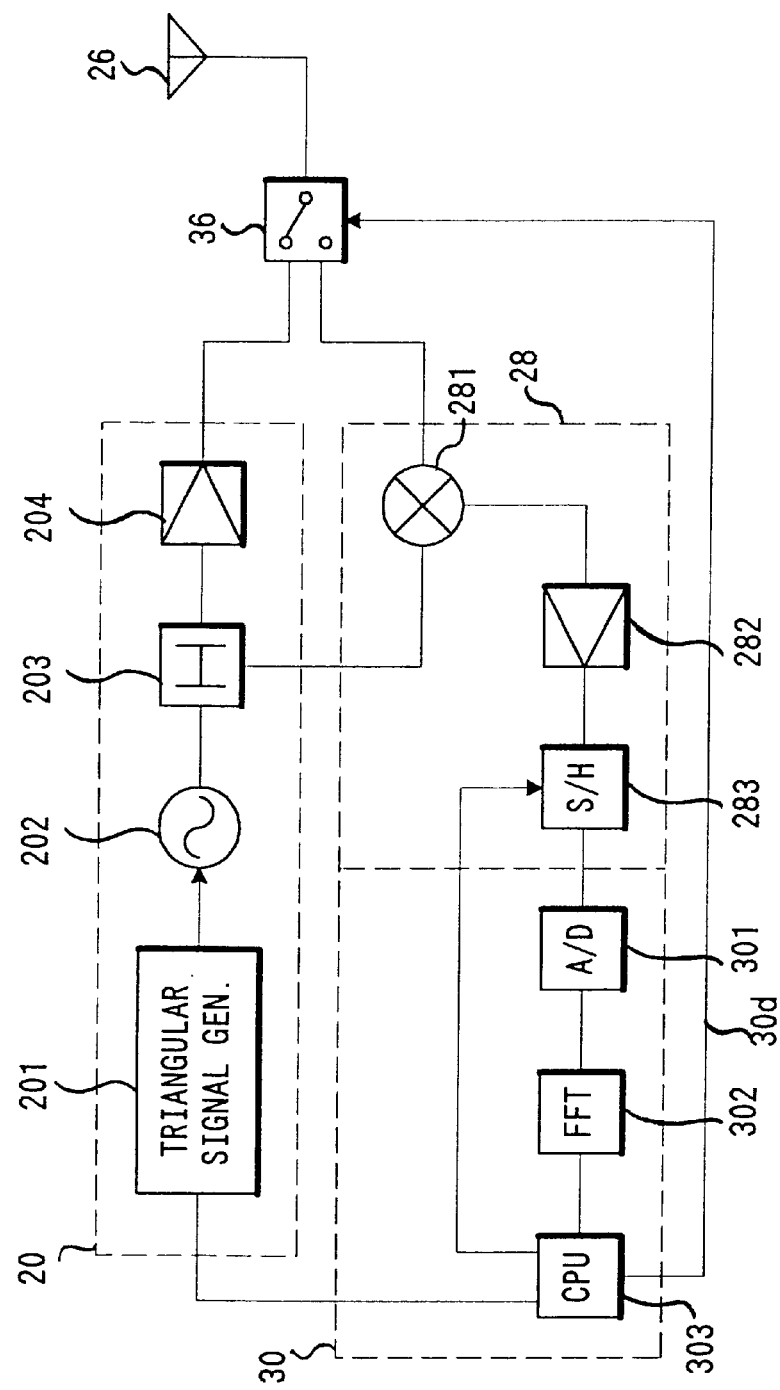
FIG. 8 is a block diagram showing a fourth embodiment of the FM-CW radar according to the present invention.

A fourth embodiment of the present invention will now be described with reference to FIGS. 8 and 9. FIG. 8 is a block diagram showing the fourth embodiment of the FM-CW radar according to the present invention. In the Figure, elements like those shown in FIG. 1 are designated by like reference numerals, while omitting their description, and parts different from FIG. 1 will be mainly described.

This embodiment of the FM-CW radar comprises, in addition to a transmitting unit 20, a transmitting/receiving antenna 26, a receiving unit 28 and a signal processing unit 30 for judging a target by calculating the relative distance, azimuth, etc. thereof, these elements having the same structures like those shown in FIG. 1, a high frequency switch 36, which directly switches the transmitting and receiving units 20 and 28 for alternate connection to the antenna 26.

The high frequency switch 36 is controlled according to a control signal 30d provided from the CPU 303 in the signal processing unit 30 such that it is in connection to the receiving unit 28 for a predetermined time in the receiving operation of the receiving unit 28 and in connection to the transmitting unit 20 for the other time than the predetermined time.

Figure 9:
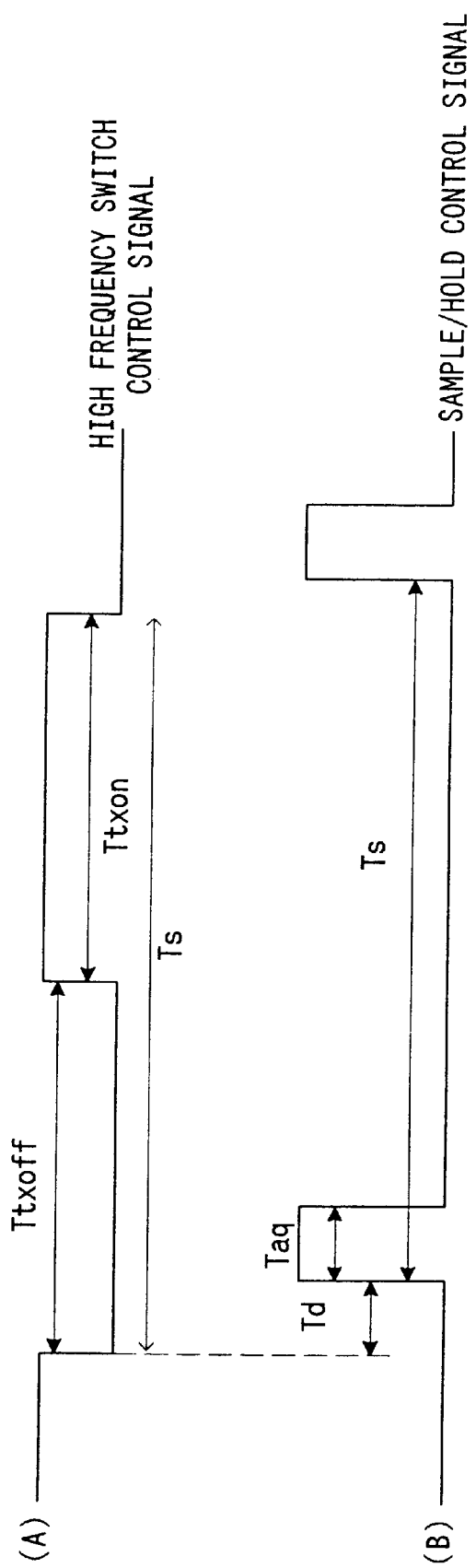
FIG. 9 is a timing chart showing the relation between the on-off control signal of the high frequency switch 36 and the sample/hold control signal in the embodiment.
Figure 10:
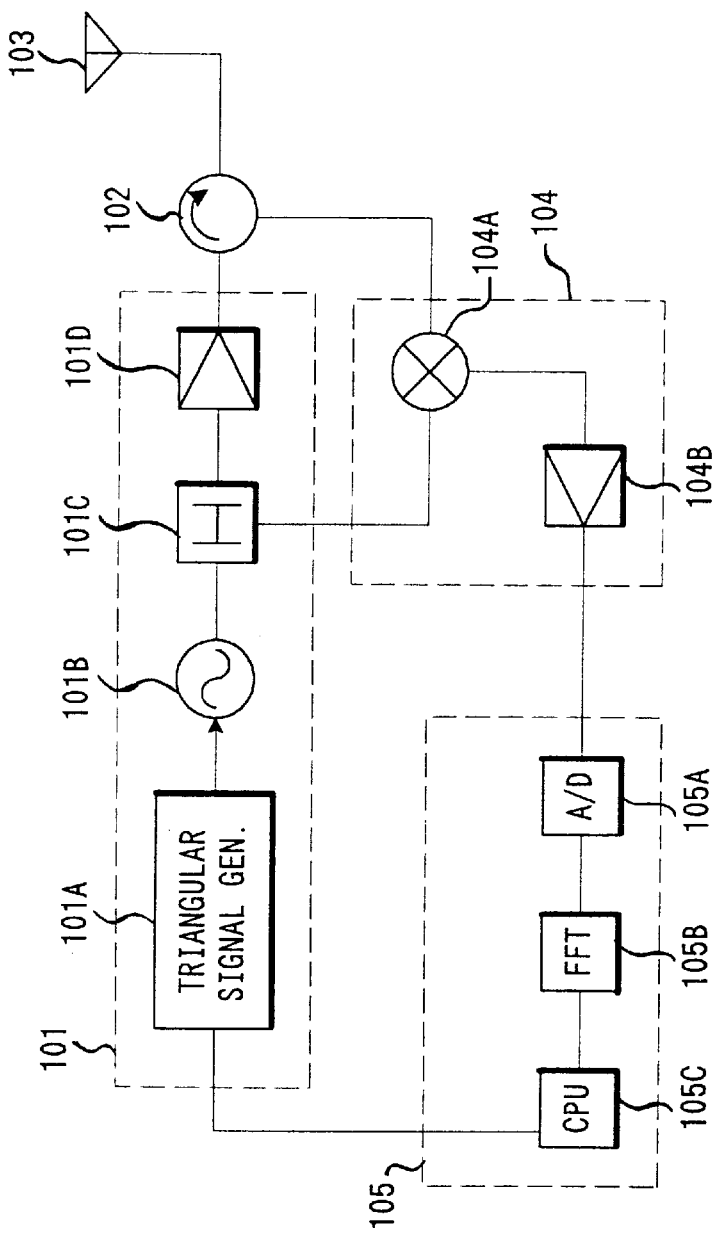
FIG. 10 is a block diagram showing a prior art FM-CW radar for inter-vehicle distance measurement.
Figure 11:
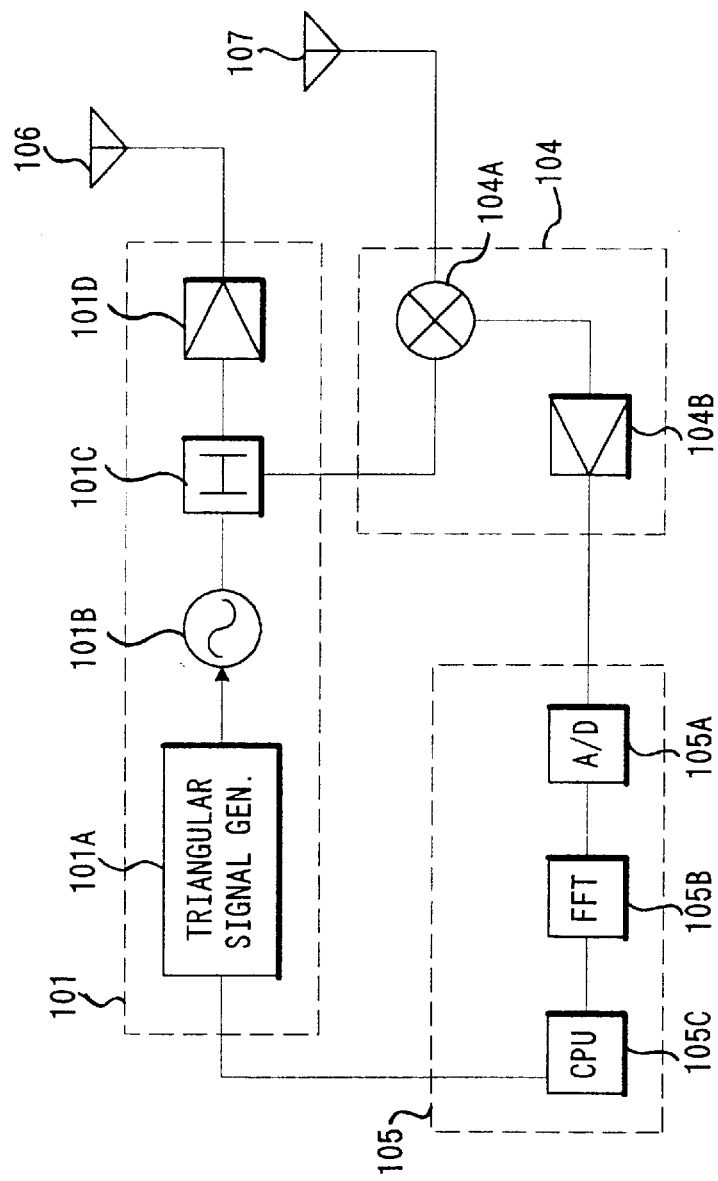
FIG. 11 is a block diagram showing a different prior art FM-CW radar.

FIG. 9 is a timing chart showing the relation between the on-off control signal of the high frequency switch 36 and the sample/hold control signal.

In the Figure, labeled (A) is the on-off control signal for the high frequency switch 36, and labeled (B) is the sample/ hold control signal for the sample/hold circuit 283 in the receiving unit 20.

As is seen from FIG. 9, when the on-off control signal fed to the high frequency switch 36 is "L", the high frequency switch 36 is switched to the side of the receiving unit 28, and when the on-off control signal is "H", it is switched to the side of the transmitting unit 20. The time Trxon, during which the high frequency switch 36 is in connection to the receiving unit 28, is set to be (Td+Taq)>Trxon=Ts−Ttxon.

As for the effects of this embodiment, with the high frequency switch 36 provided for directly switching the transmitting and receiving units 20 and 28 for alternate connection to the antenna 26, it is possible to dispense with the circulator and permit the high frequency switch for reducing sneak noise between the transmission and reception to be readily realized as a monlythic IC.

As has been described in the foregoing, the radar according to the present invention, in which a high frequency switch is inserted on at least the transmitting unit side of the paths connecting the transmitting and receiving units and the antenna for holding the transmission output "off" during the reception, it is possible to reduce sneak noise from the transmission to an extent corresponding to the isolation of the high frequency switch, thus improving the reception sensitivity. In addition, by reducing sneak noise between the transmission and reception, it is possible to increase the reception sensitivity and the maximum detectable distance, thus alleviating the characteristics of components, facilitating mass production and readily permitting cost reduction of the radar.

Furthermore, according to the present invention by using a hybrid circuit as branching means for the transmission and reception signals, it is possible to readily realize the branching means as a monolythic IC.

Moreover, according to the present invention by a high frequency switch for directly switching the
transmitting and receiving units to be alternately connected to the antennas, it is possible to dispense with the circulator and permit the high frequency switch for reducing sneak noise between the transmission and reception to be readily realized as a monolythic IC.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A radar comprising:
    a transmitting/receiving antenna;
    a transmitting unit connected to the antenna via branching means, for transmitting a continuous transmission signal obtained by frequency modulating a carrier with a modulating signal varying with time;
    a receiving unit connected to said antenna via said branching means, for mixing a reflected wave signal received from a target via said antenna and a reference signal branched from the transmission signal, extracting a beat signal from the mixture of signals, and sampling and holding said beat signal,
    a high frequency switch for transmission; inserted and for turning on and off the path between said transmitting unit and said branching means; and
    control means for providing a sample/hold control signal synchronized to a sample/hold cycle when the receiving unit samples and holds the beat signal, and blocking the transmission output of said transmitting unit for a predetermined period of time by controlling said high frequency switch "off" in synchronism to said sample/hold control signal.

2. The radar according to claim 1, wherein the sample/hold cycle for sampling and holding said beat signal is set according to a modulating frequency of the modulation of the transmission signal and a sampling frequency which is determined on the basis of the maximum frequency deviation of said modulating signal, the maximum calculated target distance and the velocity of light.

3. The radar according to claim 1, wherein said predetermined time is set to be between a time of sampling of said beat signal and a time as a result of subtraction of a time, during which said high frequency switch for transmission is held "on", from the sampling sample/hold cycle.

4. The radar according to claim 3, wherein the timing of start of holding said high frequency switch for transmission for the predetermined time is set to be before the timing of start of sampling of the beat signal by a time corresponding to a delay of response of said high frequency switch to transmission.

5. The radar according to claim 1, wherein said transmitting unit includes a triangular modulating signal generator for generating a triangular modulating signal, an oscillator for generating a continuous wave through frequency modulation with the triangular modulating signal from said triangular modulating signal generator, and a high frequency amplifier for amplifying the continuous wave from said oscillator and sending the amplified continuous wave to said antenna.

6. The radar according to claim 5, which further comprises signal processing means for judging the distance, azimuth, relative speed, etc. of a target by processing the output signal of the sample/hold circuit in the receiving unit as a result of sampling and holding the beat signal.

7. The radar according to claim 6, wherein said signal processing means includes an A/D converter for converting the output signal of said sample/hold circuit to a digital signal, a frequency analyzer for determining a frequency characteristic and a spectral characteristic of the beat signal by analyzing the beat signal on the basis of the digital signal from the A/D converter, and for determining the distance, azimuth, relative speed, etc. of the target from the results of analysis in the frequency analyzer.

8. The radar according to claim 1, wherein:
    said receiving unit includes a mixer, a beat signal amplifier and a sample/hold circuit;
    said mixer mixes a reflected wave signal received from a target by said antenna and a reference signal branched from said transmission signal and extracting a beat signal from the mixture of signals;
    the beat signal amplifier amplifies the frequency band of the beat signal from said mixer; and
    said sample/hold circuit samples and holds the amplified beat signal output of said beat signal amplifier according to a sample/hold control signal.

9. The radar according to claim 1, wherein the branching means is constituted by a circulator.

10. The radar according to claim 1, wherein said branching means is constituted by a hybrid circuit.

11. The radar according to claim 1, which further comprises a high frequency switch for reception inserted and turning on and off the path between said receiving unit and said branching means, said high frequency switch for reception being controlled, in the sampling and holding of the beat signal by the receiving unit, by said control means such as to be held "on" for a predetermined time according to the sample/hold control signal.

12. The radar according to claim 11, wherein said predetermined time is set to be between a time of sampling of said beat signal and a time as a result of subtraction of a time, during which said high frequency switch for transmission is held "on", from the sampling sample/hold cycle.

13. The radar according to claim 11, wherein the timing of start of holding said high frequency switch for transmission for the predetermined time is set to be before the timing of start of sampling of the beat signal by a time corresponding to a delay of response of said high frequency switch to transmission.

14. An FM-CW radar comprising:

a transmitting/receiving antenna;

a transmitting unit connected to said antenna, for transmitting a continuous transmission signal obtained by frequency modulating carrier with a modulating signal varying with time;

a receiving unit connected to said antenna for mixing a reflected wave signal received from a target via said antenna and a reference signal branched from the transmission signal, extracting a beat signal from the mixture of signals, and sampling and holding the beat signal;

a high frequency switch inserted and switched alternately between said antenna and transmitting and receiving units; and control means for providing, when sampling and holding the beat signal, a sample/hold control signal synchronized to a sample/hold cycle, the high frequency switch being controlled according to the sample/hold control signal such as to be in connection to said receiving unit for a predetermined time and in connection to the transmitting unit for the other time than said predetermined time.

15. The radar according to claim 14, wherein the sample/hold cycle for sampling and holding said beat signal is set according to a modulating frequency of the modulation of the transmission signal and a sampling frequency which is determined on the basis of the maximum frequency deviation of said modulating signal, the maximum calculated target distance and the velocity of light.

16. The radar according to claim 14, wherein said predetermined time is set to be between a time of sampling of said beat signal and a time as a result of subtraction of a time, during which said high frequency switch for transmission is held "on", from the sampling sample/hold cycle.

17. The radar according to claim 16, wherein the timing of start of holding said high frequency switch for transmission for the predetermined time is set to be before the timing of start of sampling of the beat signal by a time corresponding to a delay of response of said high frequency switch to transmission.

18. The radar according to claim 17, which further comprises signal processing means for judging the distance, azimuth, relative speed, etc. of a target by processing the output signal of the sample/hold circuit in the receiving unit as a result of sampling and holding the beat signal.

19. The radar according to claim 18, wherein said signal processing means includes an A/D converter for converting the output signal of said sample/hold circuit to a digital signal, a frequency analyzer for determining a frequency characteristic and a spectral characteristic of the beat signal by analyzing the beat signal on the basis of the digital signal from the A/D converter, and for determining the distance, azimuth, relative speed, etc. of the target from the results of analysis in the frequency analyzer.

20. The radar according to claim 14, wherein said transmitting unit includes a triangular modulating signal generator for generating a triangular modulating signal, an oscillator for generating a continuous wave through frequency modulation with the triangular modulating signal from said triangular modulating signal generator, and a high frequency amplifier for amplifying the continuous wave from said oscillator and sending the amplified continuous wave to said antenna.

21. The radar according to claim 14, wherein:

said receiving unit includes a mixer, a beat signal amplifier and a sample/hold circuit;

said mixer mixes a reflected wave signal received from a target by said antenna and a reference signal branched from said transmission signal and extracting a beat signal from the mixture of signals;

the beat signal amplifier amplifies the frequency band of the beat signal from said mixer; and said sample/hold circuit samples and holds the amplified beat signal output of said beat signal amplifier according to a sample/hold control signal.

* * * * *